United States Patent
Arnaut et al.

(10) Patent No.: US 9,456,616 B2
(45) Date of Patent: Oct. 4, 2016

(54) METHOD AND COMPOSITION FOR THE PREVENTION OR RETARDING OF STALING OF BAKERY PRODUCTS

(75) Inventors: Filip Arnaut, Roosdaal (BE); Fabienne Verte, Gentbrugge (BE); Nicole Vekemans, Lebbeke (BE)

(73) Assignee: Puratos Naamloze Vennootschap, Groot-Bijgaarden (BE)

( * ) Notice: Subject to any disclaimer, the term of this patent is extended or adjusted under 35 U.S.C. 154(b) by 2326 days.

(21) Appl. No.: 10/510,401

(22) PCT Filed: Apr. 7, 2003

(86) PCT No.: PCT/BE03/00062
§ 371 (c)(1),
(2), (4) Date: May 12, 2005

(87) PCT Pub. No.: WO03/084334
PCT Pub. Date: Oct. 16, 2003

(65) Prior Publication Data
US 2005/0255204 A1    Nov. 17, 2005

(30) Foreign Application Priority Data
Apr. 5, 2002 (EP) .................................. 02447056

(51) Int. Cl.
C12H 1/10 (2006.01)
A21D 8/04 (2006.01)

(52) U.S. Cl.
CPC ..................... A21D 8/042 (2013.01)

(58) Field of Classification Search
CPC ............................. A01B 12/006; A21D 8/042
USPC ........................................................ 426/321
See application file for complete search history.

(56) References Cited

U.S. PATENT DOCUMENTS

| 3,561,975 | A | * | 2/1971 | Luebering et al. ............. 426/18 |
| 4,851,234 | A | * | 7/1989 | Chung .............................. 426/7 |
| 5,124,261 | A |   | 6/1992 | Terada et al. |
| 5,569,599 | A |   | 10/1996 | Antranikian |
| 5,714,373 | A |   | 2/1998 | Stetter |
| 5,994,113 | A | * | 11/1999 | Kauppinen et al. .......... 435/212 |

(Continued)

FOREIGN PATENT DOCUMENTS

DE    156 714        9/1982
DE    225711 A1     7/1985

(Continued)

OTHER PUBLICATIONS

Odibo, F. J. C. et al. 1988. Purification and some properties of a thermostable protease of Themmoactinomyces thalpophilus. MIRCEN Journal. 4: 327-332.*

(Continued)

Primary Examiner — Hamid R Badr
(74) Attorney, Agent, or Firm — Senniger Powers LLP

(57) ABSTRACT

The present invention is related to a method for the prevention or retarding of staling during the baking process of bakery products which comprises the step of adding a sufficiently effective amount of at least one intermediate thermostable and/or thermostable serine protease in the bakery products. The present invention further relates to an improver for the prevention or retarding of staling during the baking process of bakery products, which comprises at least one intermediate thermostable and/or thermostable serine protease.

22 Claims, 5 Drawing Sheets

(56) References Cited

U.S. PATENT DOCUMENTS

Figure 1:
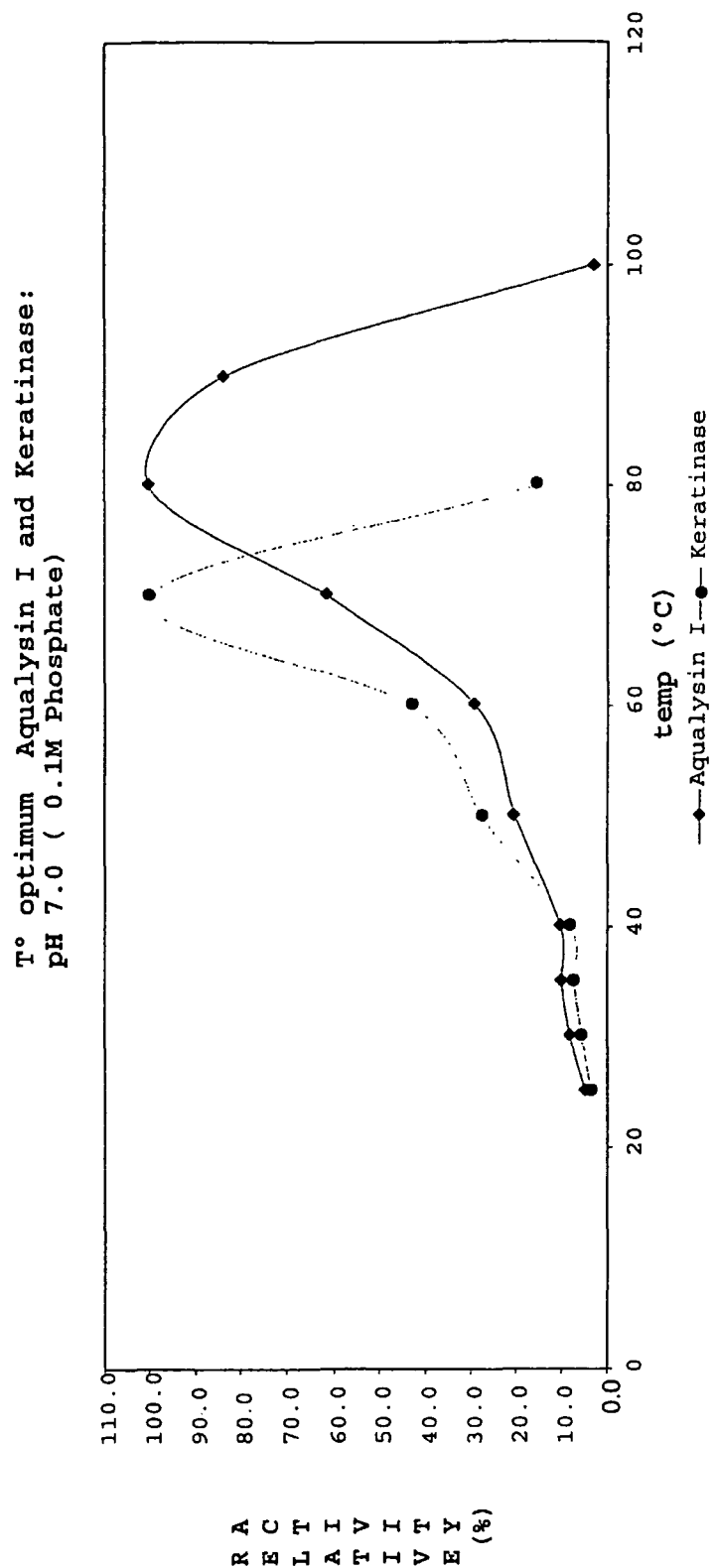

| | | | | |
|---|---|---|---|---|
| 6,110,508 | A * | 8/2000 | Olesen et al. | 426/20 |
| 6,197,352 | B1 * | 3/2001 | Olesen | 426/20 |
| 6,270,813 | B1 * | 8/2001 | Nielsen et al. | 426/20 |
| 2004/0161493 | A1 | 8/2004 | Souppe et al. | |

FOREIGN PATENT DOCUMENTS

| | | | | |
|---|---|---|---|---|
| EP | 0021179 | A2 | 1/1981 | |
| EP | 0234858 | A2 | 9/1987 | |
| EP | 0412607 | A1 | 2/1991 | |
| EP | 0776604 | A1 | 6/1997 | |
| EP | 1 186 658 | | 3/2002 | |
| EP | 1350432 | A1 | 10/2003 | |
| EP | 1790230 | A2 | 5/2007 | |
| FR | 2 827 480 | | 1/2003 | |
| GB | 375 342 | | 6/1932 | |
| GB | 906 344 | | 9/1962 | |
| RU | 2177994 | * | 1/2002 | C12N 1/20 |
| WO | 9404035 | A1 | 3/1994 | |
| WO | 01/74169 | | 10/2001 | |
| WO | 2005077192 | A1 | 8/2005 | |
| WO | 2005077194 | A1 | 8/2005 | |
| WO | 2009138447 | A1 | 11/2009 | |

OTHER PUBLICATIONS

Gray, J. A. et al. 2003. Bread staling: Molecular basis and control. Comprehensive reviews in food science and technology. 2: 1-21.*
Matsuzawa, H. et al. 1988. Purification and characterization of aqualysin I (a thermophilic alkaline protease0 produced by Thermus aquaticus YT-1. Eur. J. Biochem. 171:441-447.*
Cao S. et al. XP002252887 2003 "Efficient, broad-spectrum keratinase and its gene," & CN 1 405 305, Derwent Publications, Ltd., abstract.
Chernoglazov V.M. et al. XP002252886 2002 "Strain of bacilius licheniformis as producer of keratinase," & RU 2 177 994, Derwent Publications Ltd., abstract.
Täutel A. et al. 1984 "Enzymeinsatz zur-Rationalisierung der Wafferproduktion," Bäcker Und Konditor 32:22-24. XP008015984.
Manohar, R.S., et al., Effect of α-Amylase and Protease on the Rheological Characteristics of Dough and Quality of Biscuits, 1997, Adv Food Sci (CMTL), 19(1/2):15-21.
Schwimmer, S., Source Book for Food Enzymology, 1981, AVI Publishing, pp. 572-592.
Chemical Abstracts, 127, 4144 CA, Bacillus Licheniformis NS70, 1997, 1 page.
Chemical Abstracts, 125, 80111 CA, Bacillus Licheniformis MIR 29, 1996, 1 page.
Chemical Abstracts, 124, 224587 CA, Bacillus stearothermophilus, 1996, 1 page.
Chemical Abstracts, 114, 162444 CA, Nocardiopsis, 1991, 1 page.
Chemical Abstracts, 116, 146805 CA, Thermobacteroides, 1992, 1 page.
International Search Report and Written Opinion Issued in PCT/EP2009/055819, dated Jul. 3, 2009, 11 pages.
International Search Report Issued in PCT/BE03/00062, dated May 27, 2003, 6 pages.
International Preliminary Examination Report Issued in PCT/BE03/00062, dated May 25, 2004, 7 pages.
Dragsdorf, R.D., et al., "Bread Staling: X-Ray Diffraction Studies on Bread Supplemented with alpha-Amylases from Different Sources," 1980, Cereal Chem., 57(5):310-314.
LGM 8924 (ATCD 25104), "Thermus Aquaticus" Deposited 1989, BCCM/LMG Bacterial Catalogue Search Results, Dec. 8. 2009, 5 pages.
LMG 7561, "Bacillus Licheniformis" Deposited 1986, BCCM/LMG Bacteria Catalogue Search Results, Dec. 8, 2009, 1 page.
Martin et al., "A Mechanism of Bread Firming. I. Role of Starch Swelling," 1991, Cereal Chem., 68(5):498-503.
Martin et al., "A Mechanism of Bread Firming. II. Role of Starch Hydrolyzing Enzymes," 1991, Cereal Chem., 68(5):503-507.
Conforti, F.D., et al., "The Influence of Selected Bacterial and Fungal Enzymes on the Baking and Keeping Quality of a Fat Substituted Muffin," 1996, IFT Annual Meeting: Book of Abstracts, p. 52, Abstract only.
Drapron, R., et al., "Chapter 10. Role of Enzymes in Baking," Enzymes and Their Role in Cereal Technology, 1987, Kruger, Lineback and Stauffer, Eds., American Association of Cereal Chemists, Inc., St. Paul, Minnesota, pp. 281-324.
Taufel, A., et al., "Use of Enzymes for Rationalization of Waffle Production," 1984, Backer Und Konditor, 32(1):22-24, English translation of relevant passages, 10 pages.
Kilara, A., et al., "Preparation and Properties of Immobilized Papain and Lipase," 1977, Biotech Bioeng, XIX:1703-1714.
Data Sheet Papain, DS-001, Apr. 22, 2002, S.A. Biochem Europe N.V., 2 pages.

* cited by examiner

US 9,456,616 B2

METHOD AND COMPOSITION FOR THE PREVENTION OR RETARDING OF STALING OF BAKERY PRODUCTS

RELATED APPLICATIONS

This is a U.S. National Phase of International Application No.: PCT/BE03/00062, filed Apr. 7, 2003 and published in English on Oct. 16, 2003 as WO 03/084334, which claims the benefit of priority of European Application No.: 02447056.9, filed Apr. 5, 2002.

FIELD OF THE INVENTION

The present invention concerns a method and a composition for the prevention or retarding of staling and associated effects during the baking process of bakery products which comprise at least one intermediate thermostable and/or thermostable serine protease.

BACKGROUND OF THE INVENTION

The consumers prefer to buy fresh bread and they want it to remain fresh for a long time. Retarding the staling has always been a challenge to producers of bakery ingredients. The fact that the production of bread is more and more centralised and farther away from the distribution points puts an even larger pressure on the development of additives and ingredients to maintain the softness of bread. Also soft rolls, hamburger, buns and pastry products are subject to staling and a loss of softness. There are a number of ingredients known to retard the staling of bread and soft bakery products. Fat and emulsifiers such as distilled monoglycerides and stearoyllactylates are already used since decades. Mono-, di- and polysaccharides have a positive influence on water retention and binding. Water loss is often associated with staling and the saccharides have positive influence on the mouthfeel of baked products and thus diminish the perception of staling. Amylases are known to have a beneficial effect on staling and starch retrogradation.

Bread staling is a complex phenomenon. It is perceived as a softening of the crust, a hardening of the crumb and the disappearance of fresh bread flavour. The hardening of the crumb is not only due to a loss of water during storage as was already demonstrated by Boussingault in ((1852) Ann. Chim. Phys. 3, 36, 490). It is the result of a number of physico-chemical processes. Over the years, researchers have tried to unravel these processes and developed different theories.

In the early days, bread firming was attributed solely to the retrogradation of starch (Katz, J. R. (1930) Z. Phys. Chem., 150, 37-59). It was shown by X-ray diffraction that the starch in bread is forming a micro-crystalline structure during storage. Later it was shown that the water soluble starch fraction diminished during bread staling (Schoch et al. (1947) Cereal Chem., 24, 231-249), which concludes that during baking starch granules absorb water. The linear amylose chains become soluble and diffuse to the water phase. In time more and more amylose is present in the water phase. So the amylose is partially leached out of the swollen starch granules. The branched amylopectine remains in the granules. The leaching process is limited by the available water. During cooling the amylose retrogrades very quickly and forms a gel. The retrogradation of amylopectine is believed to involve primarily association of its outer branches and requires a longer time than does the retrogradation of amylose, giving it prominence in the staling process, which occurs over time after the product has cooled, aggregate more slowly, due to stereochemical interferences. The amylopectine formed intramolecular bonds. The prominent role of starch in staling of bread is further illustrated by the use of carbohydrases to diminish or to slow down the staling of baked products. It was shown (Conn J. F. et al. (1950) Cereal Chem., 27, 191-205) that amylases from bacterial or fungal origin slow down the rate of staling of bread and result in a less firm crumb structure. The addition of thermostable alfa-amylases or beta-amylases is most effective. However this also results in a gummy and sticky crumb.

The document EP0412607 discloses the use of a thermostable alfa-1,6-endoglucanase or an alfa-1,4-exoglucanase to reduce staling; EP0234858 discloses the use of a thermostable maltogenic beta-amylase to retain the crumb softness.

However, it is still not clear whether the anti-staling effect is due to the dextrins produced or to the modification of the amylose and amylopectine and the consequent reduced tendency to crystallise. Also the influence of emulsifiers as glycerolmonostearate and sodiumstearoyllactylate seems to confirm the role of starch in bread crumb firming (Schuster G. (1985) Emulgatoren für Lebensmittel—Springer Verlag 323-329). It is the interaction between these emulsifiers and the starch which results in a changed starch conformation that accounts for the observed reduction of staling.

As there was not always a good correlation between starch structure and staling (Zobel H. F. et al (1959) Cereal Chem., 36, 441), other flour constituents were also investigated. The role of flour proteins in the crumb firming process has been studied but it was found that they were less important than starch (Cluskey, J. E. (1959) Cereal Chem., 36, 236-246.), (Dragsdorf, R. D. et al. (1980) Cereal Chem., 57, 310-314) studied the water migration between starch and gluten during bread storage. These authors concluded that due to a change in the cristallinity of the starch, it adsorbed more water, so the water migrates from the gluten to the starch and so less free water is available.

In later study (Martin et al. (1991) Cereal Chem., 68(5), 498-503 and 503-507), it appears that the high molecular weight dextrins do not have an antifirming effect on bread crumb. Instead, the high DP dextrins may entangle and/or form a hydrogen bond with protein fibrils, thus effectively cross-linking the gluten. Consequently, the firming rate is increased. It is stated that in weaker flours the gluten interacts stronger with the starch granules. This results in bread crumb that firms faster. However better gluten quality and stronger flour also result in higher loaf volume and thus in a softer crumb. Axford et al. (1968) cited in Faridi, H. (1985) Rheology of wheat products, AACC, p. 263-264) showed that the loaf specific volume was a major factor in measuring both the rate and the extent of firming. So the role of gluten in bread firming remains still questionable and few attempts have been made to slow down firming based on gluten modification.

Proteases have a long history of use in the baking sector. They are mostly used by the baker to reduce mechanical dough development requirements of unusually strong or tough gluten. They lower the viscosity and increase the extensibility of the dough. In the end product they improve the texture compressibility, the loaf volume and the bread colour. Also the flavour can be enhanced by production of certain peptides. The proteases mellow the gluten enzymatically rather than mechanically. They reduce the consistency of the dough, decreasing the farinograph value. The proteases most used in baking are from *Aspergillus oryzae* and *Bacillus subtilis*. The neutral bacterial proteases are by far more active on gluten than the alkaline proteases. Papain, bromelain and ficin are thiol-proteases extracted from papaya, pineapple and figs. Especially papain is very reactive towards gluten proteins. Bacterial proteases and papain, especially neutral proteases, are used in cookies, breadsticks and crackers where a pronounced slackening of the dough is wanted. However, in breadmaking, a more mild hydrolysis of fungal proteases is preferred.

Proteases also have major disadvantages. The action of the proteases is not limited in time, it continues after mixing and weakens the dough structure in time. This phenomenon increases the risk of weakening the dough and increases the stickiness of the dough. Sometimes their action is even enhanced by the pH drop during fermentation. The use of proteases in baking requires strict control of the bulk fermentation and proofing conditions of the dough. The proteases are inactivated during baking (Kruger, J. E. (1987) Enzymes and their role in cereal technology AACC 290-304). Especially neutral *Bacillus* proteases and papain should be dosed very carefully as overdoses slacken the dough too much. This may result in dough collapse before ovening or a lower bread volume and a more open crumb structure. Especially in Europe, where the flours are weaker than in the US or Canada, the risk of overdosing protease is very present.

Furthermore, proteases also increase stickiness because by the hydrolytic action water is released from the gluten (Schwimmer, S. (1981) Source book of food enzymology-AVI Publishing, 583-584). This means that in practice proteases are not much used in breadmaking in Europe.

The document EP021179 discloses the use of an alfa-amylase preparation in which the protease (inactivated) was used in combination with emulsifiers to inhibit staling.

Conforti et al. (1996) FSTA, 96(12), M0190 Abstract of presentation) added an enzyme mixture comprising bacterial amylase, fungal amylase and fungal protease to fat substituted muffins. The control fat containing muffin was more tender. The enzyme treatment decreased the staling rate. This is not surprising in view of the presence of amylases.

Lipase is also known to soften bread crumb and to somewhat reduce the firming rate of bread crumb (WO 94/04035 example 2).

Fungal proteases are sensitive to high temperatures. Their potency of protein hydrolysis in a moderate to high temperature range of about 50° C. or higher is normally poor. Some bacterial neutral and alkaline proteases are resistant to higher heat treatments. Till now reports on bacteria-derived proteases with heat resistance that can retain good peptidase activity, for example, in a high temperature range of about 60° C. have been scarce. The document EP1186658 discloses such enzyme produced by a bacterium of the genus *Bacillus subtilis*, more specifically an M2-4 strain. The disclosed enzyme mixture, however, completely looses its activity at a temperature of about 70° C. Neutral thermostable proteases from *Bacillus*, which may be tolerant to oxidising agents, are preferred in detergent formulations. Also alkaline thermostable proteases from *Bacillus* are used in washing and detergent formulations. Papain is very heat stable and requires a prolonged heating at 90-100° C. for deactivation. Bromelain is less stable and can be deactivated at around 70° C. Other heat stable proteases are produced by *Bacillus licheniformis* NS70 (Chemical Abstracts, 127, 4144 CA), *Bacillus licheniformis* MIR 29 (Chemical Abstracts, 116, 146805 CA), *Bacillus stearothermophilus* (Chemical Abstracts, 124, 224587 CA), Nocardiopsis (Chemical Abstracts, 114, 162444 CA) and Thermobacteroides (Chemical Abstracts, 116, 146805 CA). This is not an exhaustive list, but it illustrates the importance of the thermostable serine proteases and their application, mostly in detergents. No reference is made to baking and anti-staling properties.

Lipase is also known to soften bread crumb and to somewhat reduce the firming rate of bread crumb (WO 94/04035 example 2).

Fungal proteases are sensitive to high temperatures. Some bacterial neutral and alkaline proteases are resistant to higher heat treatments. Neutral thermostable proteases from *Bacillus*, which may be tolerant to oxidising agents, are preferred in detergent formulations. Also alkaline thermostable proteases from *Bacillus* are used in washing and detergent formulations. Papain is very heat stable and requires a prolonged heating at 90-100° C. for deactivation. Bromelain is less stable and can be deactivated at around 70° C. Other heat stable proteases are produced by *Bacillus licheniformis* NS70 (Chemical Abstracts, 127, 4144 CA), *Bacillus licheniformis* MIR 29 (Chemical Abstracts, 116, 146805 CA), *Bacillus stearothermophilus* (Chemical Abstracts, 124, 224587 CA), Nocardiopsis (Chemical Abstracts, 114, 162444 CA) and Thermobacteroides (Chemical Abstracts, 116, 146805 CA). This is not an exhaustive list, but it illustrates the importance of the thermostable serine proteases and their application, mostly in detergents. No reference is made to baking and anti-staling properties.

Papain is a proteolytically active constituent in the latex of the tropical papaya fruit. The crude dried latex contains a mixture of at least four cysteine proteinases.

Thermolysin is an extracellular, metalloendopeptidase secreted by the gram-positive thermophilic bacterium *Bacillus thermoproteolyticus*.

STATE OF THE ART

Keratinase is a protease which is active on keratin, a scleroprotein existing as a constituent in mammalian epidermis, hair, wool, nails and feathers. Practical applications of the enzyme are as ingredient in depilatory compositions; as dehairing aid of hides in leather manufacture, the breaking down of keratin and reconstitution into textile fabrics. No application of said enzyme in the food industry is known.

*Thermus aquaticus* is a hyperthermophile belonging to the Archea. The well known "Taq polymerase"™ is isolated from this organism. *Pyrococcus furiosus* is another representative from this group. Thermostable proteases were isolated from these organisms.

Thermitase is an extracellular endopeptidase from *Thermoactinomyces vulgaris*. Because of its relatively low cleaving specificity towards peptide bonds, thermitase has many applications. It is suitable for producing partially hydrolysed proteins for health and other special diets.

SUMMARY OF THE INVENTION

A first aspect of the present invention is related to a method for the prevention or retarding of staling and associated effects during the baking process of bakery products, said method comprising the step of adding a sufficiently effective amount of at least one thermostable protease to the ingredients of said bakery products.

Preferably said proteases are neutral or alkaline proteases, most preferably alkaline proteases.

Preferably, the intermediate thermostable and/or thermostable serine protease has its optimal temperature activity higher than 60° C., preferably higher than 70° C., more preferably higher than 75° C. or even higher than 80° C. The preferred intermediate thermostable and/or thermostable serine protease used in the method according to the invention presents a ratio between the protease activity at optimum temperature and the protease activity at 25° C., higher than 10, preferably higher than 15. As such the enzyme will preferably be active during the baking process and preferably not during the rising process.

Such intermediate thermostable and/or thermostable serine protease can be obtained by extraction from naturally occurring eukaryotic or prokaryotic organisms, by synthesis or by genetic engineering by a method well-known to a person skilled in the art.

The preferred intermediate thermostable and/or thermostable thermostable serine protease is Taq protease which can be advantageously isolated from the strain *Thermus aquaticus* (LMG8924) or is keratinase, preferably isolated from *Bacillus licheniformis* (LMG7561) or is thermitase isolated from *Thermoactinomyces vulgaris*. These three proteinases all belong to the class of the serine peptidases. Papain (belonging to the class of cysteine peptidases) and thermolysin (belonging to the class of metallopeptidases) were also included in the baking trials performed but were not able to reduce staling and/or had undesirable side effects and/or negative effects on the baking process and the resulting products.

In the method according to the invention, use of the intermediate thermostable and/or thermostable serine protease can be combined with another enzyme, such as a thermostable α-amylase, β-amylase, intermediate thermostable maltogenic amylase, lipase, glycolsyltransferases or pullulanases. The thermostable protease can also be added to a non-enzymetic additive such as an emulsifier (monoglyceride, diglyceride and/or stearoyllactylades). Other suitable emulsifiers may also be added to said intermediate thermostable and/or thermostable serine protease during the baking process. Synergistic or cumulative effects are present.

Therefore, the method according to the invention will result in improved bakery products which are preferably selected from the group consisting of bread, soft rolls, bagels, donuts, danish pastry, hamburger rolls, pizza, pita bread and cakes.

Another aspect of the present invention is related to an anti-staling composition for bakery products comprising at least one thermostable protease.

Another embodiment of the present invention is an improver composition, more specifically a bread improver composition, comprising at least one intermediate thermostable and/or thermostable serine protease and the usual active ingredients of an improver composition. An improver composition is a well-known concept amongst bakers. It is a mixture of active ingredients such as enzymes and emulsifiers, which are mixed with the usual ingredients for making bread, such as flour and water.

A further embodiment of the present invention is related to the use of said intermediate thermostable and/or thermostable protease, especially a keratinase of the invention in the food industry and more specifically in bakery products.

DETAILED DESCRIPTION OF THE INVENTION

The invention relates to the use of an intermediate thermostable and/or thermostable serine protease in baked goods. Preferably, these serine proteases are alkaline proteases but they can also be neutral proteases. The enzyme preparation has a pronounced effect on crumb softness and on retarding the staling of baked products. The enzyme preparation is characterised by the fact that it has no adverse effect on dough rheology, on the crumb structure and on the volume of the resulting bread. The enzyme has a low activity at a temperature of 25° C. to 40° C. meaning that they will have no to low activity during dough resting and/or rising. The enzyme has a temperature optimum of 60° C.-80° C. or higher. The enzyme is or is not inactivated during the baking process. The intermediate thermostable and/or thermostable serine proteases according to the present invention are characterised by having a positive effect as anti-staling agents. This effect is especially noticeable in combination with other anti-staling enzymes. As examples of other anti-staling enzymes the person skilled in the art may select thermostable amylases from *Bacillus licheniformis* or *Bacillus stearothermophilus* and thermostable maltogenic amylases (i.e. Novamyl® from Novozymes). Their effect is also additive to the anti-staling effect of mono- en diglycerides, stearoyllactylates and other emulsifiers used in baking.

The intermediate thermostable and/or thermostable serine proteases of the invention can be used in bread, soft rolls, bagels, donuts, danish pastry, hamburger rolls, pizza and pita bread, cake and other baked products where staling and inhibition thereof is an quality issue.

The intermediate thermostable and/or thermostable serine protease of the invention can be produced by prokaryotes (bacteria) and eukaryotes (fungi, Archea, animals, plants etc) and/or can be produced by genetic engineering or even by synthesis with any technique known in the art.

Basically the most important characteristics of the proteases that are used in this invention are:

1) Their thermostability: At a pH where the enzyme is stable they have a temperature optimum that is higher than 60° C., preferably higher than 70° C. and even more preferable higher than 75° C., higher than 80° C. or 85° C.
2) The ratio between the activity at optimum temperature and at 25° C. is at least higher than 10 and preferable higher than 15.
3) They belong to the group of the serine proteases.

Preferably, the proteases of the invention do not loose their activity at temperatures higher than 60° C., preferably higher than 70° C., 75° C., 80° C. or even 85° C. The enzymes of the present invention may still be active at the very high internal temperatures that are reached within a product during baking (at least about 75° C. for yeast leavened baked food and at least about 90° C.-95° C. for chemically leavened baked food, when fully baked). Within the optimum range of temperature, the temperature may range anywhere from about 60° C. to 61° C., 62° C., 63° C., . . . 84° C., 85° C., . . . 89° C., 90° C., . . . 94° C., 95° C. with all integers included therein.

The enzyme of the invention is preferably a keratinase, a Taq protease and/or a thermitase. The keratinase is preferably produced by *Bacillus licheniformis* (example *B. licheniformis* LMG 7561). The Taq protease is preferably produced by *Thermus aquaticus* (example *Thermus aquaticus* LMG 8924). The thermitase is preferably produced by Thermoactinomyces vulgaris.

The proteases may be obtained from the respective micro-organisms by use of any suitable technique. For instance, the protease preparation may be obtained by fermentation of a micro-organism and subsequent isolation of the protease containing preparation from the resulting broth by methods known in the art such as centrifugation and ultrafiltration. The proteases may also be obtained by cloning the DNA sequence coding for a suitable protease in a host organism, expressing the protease intra- or extra-cellular and collecting the produced enzyme. Preferably, the protease is present in a form that allows exact and/or more or less exact dosing. Dosing can be difficult when the proteases are part of a complex natural mixture comprising more than one type of enzymes. In such case, the enclosure of one or more purification steps might be needed.

The proteases may also be obtained by directed evolution or gene shuffling of thermostable or non-thermostable serine proteases or enzymes. As long as they have peptide cleaving activity, they are considered to be proteases in the scope of this invention.

Surprisingly, the inventors found that the use of a protease which had no perceivable action on the dough rheology had a pronounced effect on the softness and retardation of the crumb hardness. There was no adverse effect on the crumb elasticity or no increase of the crumb stickiness as compared to a control. The effect was additive to known anti-staling agents (such as -amylases) and permits the development of bread and other soft bakery products with a prolonged shelf life.

The choice of the protease is very important. The protease should exert no adverse effect during mixing and the subsequent proofing. Otherwise the dosage that can be administered is to low to diminish the staling rate and to maintain a good crumb elasticity. The higher the temperature optimum of the enzyme, the lower the negative effect on the crumb structure and on the dough rheology.

The present invention will be described hereafter in detail in the following non-limiting examples and in reference to the enclosed figures.

SHORT DESCRIPTION OF THE FIGURES

The FIG. 1 represents the protease temperature optimum expressed in function of the relative activity (%) at pH 7.0, in a buffered solution of 0.1 M phosphate for aqualysin I (♦, full line) and keratinase (●, dotted line).

Figure 2:
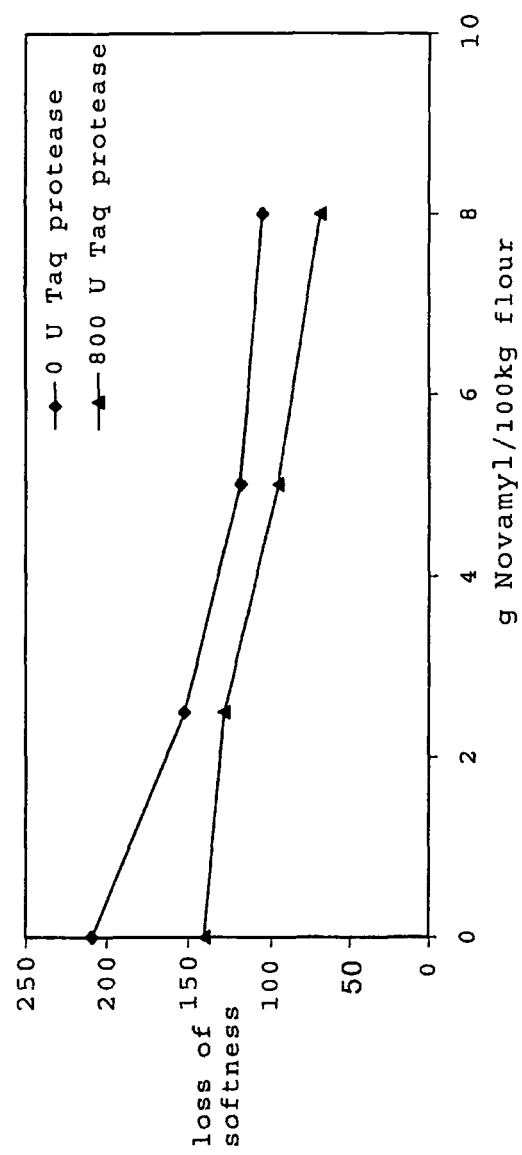

The FIG. 2 represents the retarding effect of the addition of Taq protease (0 U: ♦, 800 U: ) upon staling of bread in the absence and presence of Novamyl® (0-8 g/100 kg flour).

Figure 3:
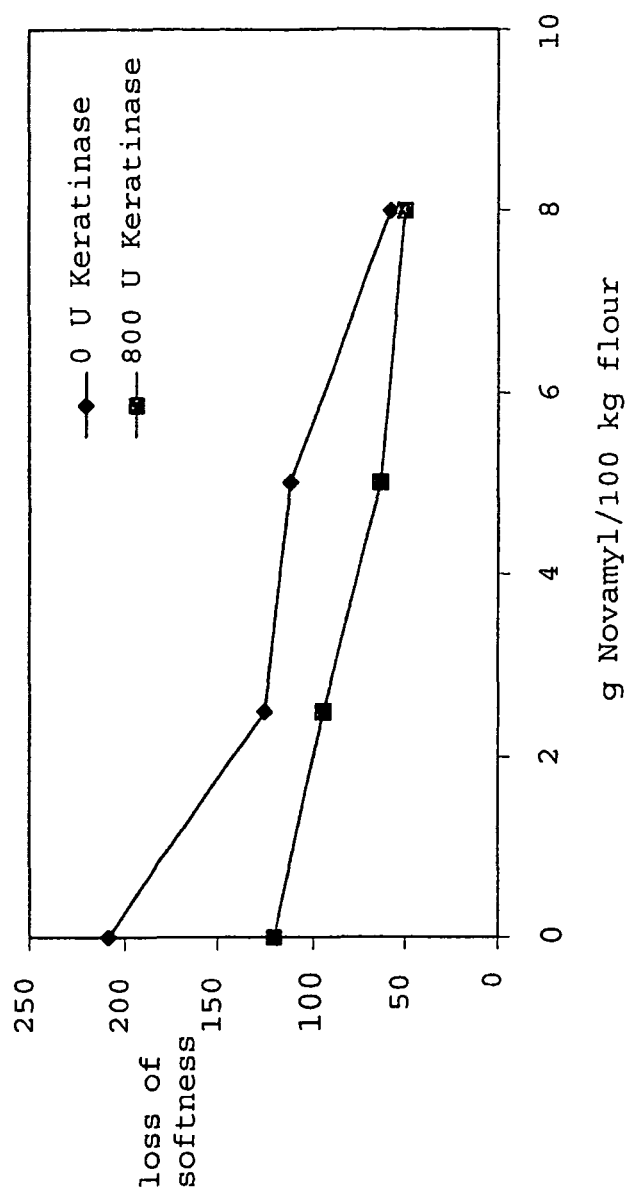

The FIG. 3 shows the improved effect on retarding bread staling following the addition of keratinase (0 U: ♦, 800 U: ) in bread in the absence or presence of Novamyl® (0-8 g/100 kg flour).

Figure 4:
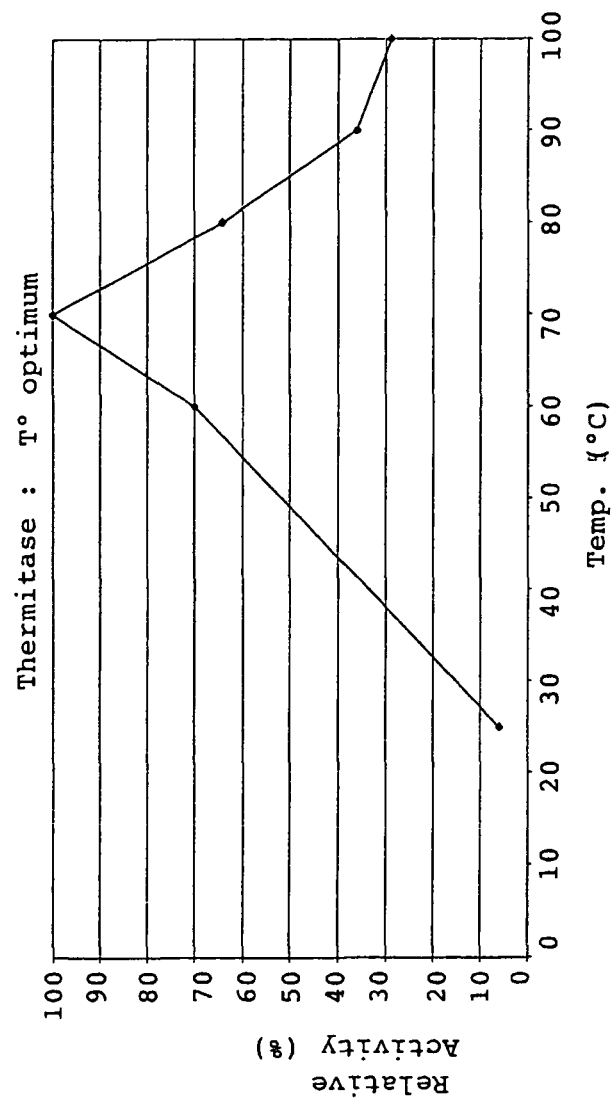

The FIG. 4 shows the temperature optimum of thermitase, expressed in function of its relative activity (%) at pH 7.0, in a buffered solution of 0.1 M phosphate.

Figure 5:
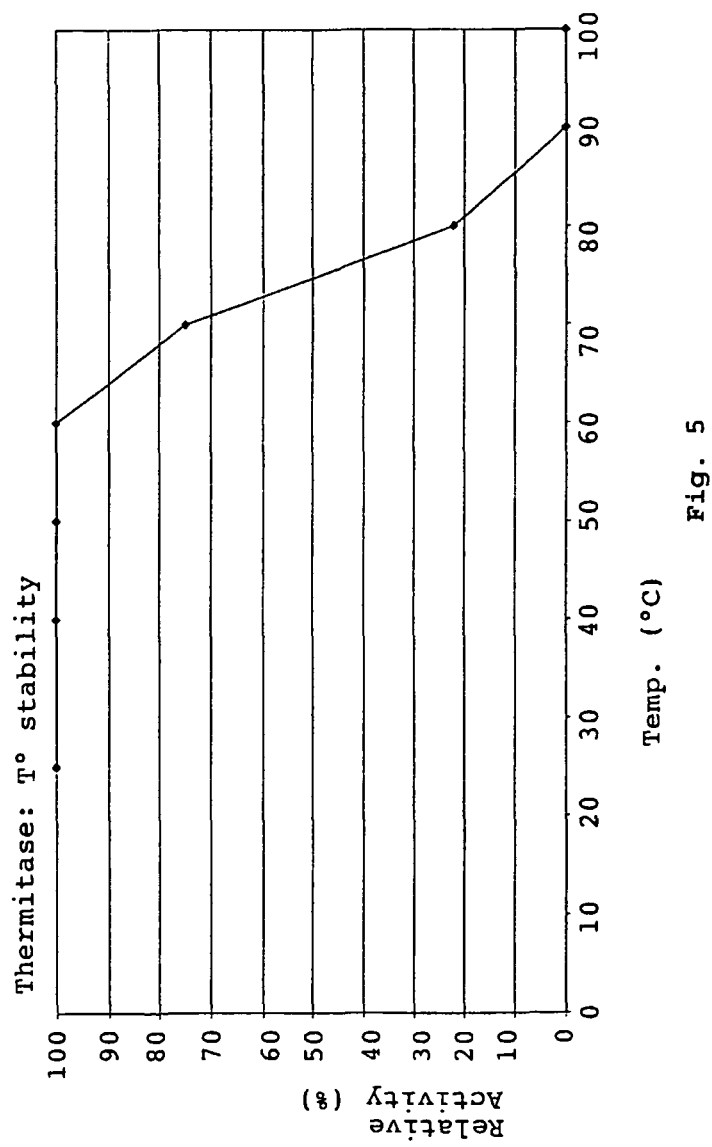

The FIG. 5 shows the thermal stability of thermitase, expressed in function of its relative activity (%).

DESCRIPTION OF A PREFERRED EMBODIMENT OF THE INVENTION

One of the preferred serine proteases used, is obtained from the strain *Bacillus licheniformis* LMG 7561 and has keratinase activity. By amino acid similarity and phenylmethylsulfonyl fluoride inhibition, the keratinase was demonstrated to be a serine protease. The keratinase in question is obtained by culturing the strain *Bacillus licheniformis* LMG 7561 on the following medium: 0.5 g/l NH$_4$Cl, 0.5 g/l NaCl, 0.3 g/l K$_2$HPO$_4$, 0.4 g/l KH$_2$PO$_4$, 0.1 g/l MgCl$_2$.6H$_2$O, 2 g/l citric acid, 0.1 g/l yeast extract and 10 g/l feather meal. The medium is adjusted to pH 6.5 with phosphoric acid. No pH control is imposed. Incubation is done at 45° C. with aeration (P$_2$ 60%, 1.25 vvm) during 40 hours after which the medium is collected for further concentration. The supernatant is then concentrated by membrane ultrafiltration (mo-lecular cut off: 5,000 Da). The crude keratinase solution obtained that way is stored frozen until used in baking tests.

The keratinase solution obtained that way displays maximum activity at a temperature of 60° C. and a pH of 8.0. In the pH range of 7 to 9 more than 85% of the maximum activity was measured. There isn't almost any loss of enzyme activity while heating the solution an hour at 60° C. Heating the enzyme at 70° C. during 14 min reduces the activity with 50%.

The activity was measured on keratin. For standard measurements, 4 g of keratin were dissolved in 100 ml sodium hydroxide. After dissolution the pH is adjusted slowly to 8.0 with 3.2 M phosphoric acid. Distilled water is added to a final volume of 200 ml. 5 ml of the substrate solution is pre-incubated at 60° C. 1 ml of enzyme solution is added and incubated at 60° C. Then 5 ml of 14% TCA (TriChloro-Acetic acid) is added to the incubated enzyme solution. Mixed for 60 minutes. The solution is filtered and the absorbance is measured at 275 nm relative to a blank solution (enzyme added after the TCA addition).

$$\text{The activity is expressed as KU/ml} = \frac{(A275 \text{ nm Enzyme} - A275 \text{ nm Blanc}) * 11}{0.0075 * 30}$$

The fermentation contained 300 to 1500 KU/ml.

For baking purposes the activity was expressed as mU/ml based on the protazym tablet determination. The KU were only used to demonstrate the presence of the keratinase.

The Taq protease in question is obtained by culturing the strain *Thermus aquaticus* LMG 8924 on the following medium: 1 g/l tryptone; 1 g/l yeast extract; 100 ml/l salt solution and 900 ml distilled water. The pH is adjusted to 8.2 with 1 M NaOH prior to sterilisation 121° C. for 15 minutes. The salt solution has the following composition: 1 g/l nitriloacetic acid 0.6 g/l CaSO$_4$.2H$_2$O; 1 g/l MgSO$_4$.7H$_2$O; 80 mg/l NaCl, 1.03 g/l KNO$_3$; 6.89 g/l NaNO$_3$; 2.8 g/l Na$_2$HPO$_4$.12H$_2$O; 10 ml/l FeCl$_3$.6H$_2$O solution (47 mg/100 ml); 10 ml/l Trace element solution and 1 l distilled water. The Trace element solution has the following composition: 0.5 ml/l H$_2$SO$_4$; 1.7 g/l MnSO$_4$.H$_2$O; 0.5 g/l ZnSO$_4$.7H$_2$O; 0.5 g/l H$_3$BO$_3$; 25 mg/l CuSO$_4$.5H$_2$O; 25 mg/l Na$_2$MoO$_4$.2H$_2$O; 46 mg/l CoCl$_2$.6H$_2$O and 1 l distilled water. Incubation is done at 60° C. with aeration (pO$_2$ 60%, 4 vvm) during 24 hours after which the medium is collected for further concentration. *Thermus aquaticus* LMG 8924 produced at least two kinds of extracellular proteases. One of the extracellular proteases was called aqualysin I, and is an alkaline protease which was secreted linearly from the early stationary phase until the time the cells ceased to grow. The optimum temperature of the proteolytic activity was between 70 and 80° C. The other was called aqualysin II and is a neutral protease, the production of which appeared from day 4 and the concentration of this protease continued linearly for 5 days. The maximum activity was obtained at 95° C. (the highest temperature tested). The fermentation extract was used after 1 day of fermentation for the baking tests. As the fermentation was stopped after 1 day, the protease present is the aqualysin I. Aqualysin I is strongly inhibited by the microbial serine protease inhibitors and can be classified as an alkaline serine protease.

The supernatant is then concentrated by membrane ultrafiltration (molecular cut off: 10,000 Da). The crude Taq protease solution obtained that way is stored frozen until used in baking tests.

The Taq protease solution obtained that way displays maximum activity at a temperature of 80° C. There isn't almost any loss of enzyme activity while heating the solution an hour at 80° C. Heating the enzyme at 90° C. during 10 min reduces the activity with 60%.

The protease activity was measured on azurine-crosslinked casein (AZCL-casein). It is prepared by dyeing and crosslinking casein to produce a material which hydrates in water but is water insoluble. Hydrolysis by proteases produces water soluble dyed fragments, and the rate of release of these (increase in absorbance at 590 nm) can be related directly to enzyme activity (Protazyme AK Tablets, Megazyme, Ireland). A protazyme AK tablet is incubated in 100 mM $Na_2HPO_4.2H_2O$; pH 7.0 at 60° C. for 5 min. An aliquot of enzyme (1.0 ml) is added and the reaction is allowed to continue for exactly 10 min. The reaction is terminated by the addition of tri-sodium phosphate (10 ml, 2% w/v, pH 12.3). The tube is allowed to stand for approx. 2 min at room temperature and the contents are filtered. The absorbance of the filtrate is measured at 590 nm against a substrate blank. The activity is expressed as $$mU/ml=(34.2*(Abs_{590}enzyme-Abs_{590}\ blank)+0.6)/dilution$$

In the case of the thermophilic microorganism, *Thermoactinomyces vulgaris*, it is known that during the logarithmic phase of multiplication several proteolytic enzymes are secreted into the surrounding medium. Among the up to five proteolytic components of the culture filtrate one protease dominates amounting 70 to 80% of the total activity, termed thermitase.

Thermitase is an extracellular, thermostable serine proteinase. The pH profile shows a broad optimum between pH 7.5 and 9.5. The enzyme demonstrates maximal stability in the pH range of 6.4 to 7.6 with increasing instability beyond pH 8.0 and below 5.75, especially at elevated temperatures and longer time periods. Depending on the size of the substrate, thermitase shows maximum activity at temperatures ranging from 65° C. (gelatin), 70° C. (protamine) to 85° C. (azocasein). The temperature optimum is most pronounced with the biggest substrate (azocasein): activity at 85° C. is 12 times over the activity shown at 25° C.

Thermitase in question is obtained by culturing the strain *Thermoactinomyces vulgaris* NRRL b-1617 in a culture medium with the following composition: wheat starch (20 g/l), bacteriological pepton (5 g/l), yeast extract (3 g/l) and malt extract (3 g/l) in destilled water. Incubation is done at 45° C. with an aeration of 12 l/min and a rotation of 200 rpm. The supernatant was collected after 24 h of incubation. Because of the fact that the culture supernatant contained a lot of α-amylase activity, a first purification step was performed to separate the protease activity from the α-amylase activity to perform baking trials. The supernatant was concentrated by membrane ultrafiltration (molecular cut off: 10,000 Da). Thermitase was purified by column chromatography on a S-sepharose column (Pharmacia). The column was equilibrated with 500 mM Na-acetate buffer (pH 4.5) and afterwards with 10 mM Na-acetate buffer (pH 4.5) and 5 mM $CaCl_2$. The α-amylase activity didn't bind on the column and thermitase was eluted with 10 mM Na-acetate buffer (pH 4.5), 5 mM $CaCl_2$ and 1 M NaCl. The eluted fraction was dialysed against 10 mM Na-acetate buffer (pH 4.5) and 5 mM $CaCl_2$ and used to perform baking trials.

Side-activities like -amylase activity was measured by the Phadebas Amylase Test™ (Pharmacia & Upjohn). The substrate is a water-insoluble cross-linked starch polymer carrying a blue dye. It is hydrolysed by -amylase to form water-soluble blue fragments. The absorbance of the blue solution is a function of the -amylase activity in the sample.

Xylanase side-activity was measured by the xylazyme Method™ (Megazyme). The substrate employed is azurine-crosslinked xylan. This substrate is prepared by dyeing and crosslinking highly purified xylan (from birchwood) to produce a material which hydrates in water but is water insoluble. Hydrolysis by endo-(1,4)- -D-xylanase produces water soluble dyed fragments, and the rate of release of these (increase in absorbance at 590 nm) can be related directly to enzyme activity.

The Taq protease solution obtained didn't show any -amylase or xylanase side activity.

The keratinase solution obtained had no xylanase activity and contained less than 8 U/ml α-amylase activity as measured by Phadebas test.

The thermitase solution obtained after the purification process didn't show any α-amylase or xylanase side activity.

The baking tests were performed in 1 kg bread. The basic recipe was (in grams):

| | |
|---|---|
| Flour (Duo): | 1500 |
| Water: | 840 |
| Fresh Yeast (Bruggeman, Belgium): | 75 |
| Sodium Chloride: | 30 |
| Partially hydrogenated palm oil: | 21 |
| Distilled monoglycerides: | 3 |
| Saccharose: | 6 |
| Ascorbic acid: | 0.06 |

The following breadmaking process was used: The ingredients were mixed for 2' at low and 6' at high speed in a Diosna SP24 mixer. The final dough temperature was 29° C. After bulk fermentation for 20' at 25° C., 600 g dough pieces were made up using the Euro 200S (Bertrand-Electrolux Baking) set at R8/L19 and moulded. The dough pieces are proofed at 35° C. for 50' at 95% relative humidity. Then the breads are baked at 230° C. in a MIWE CONDO (Micheal Wenz—Arnstein—Germany) oven with steam (0.1 L before and 0.2 L after ovening the breads). It is obvious to one skilled in the art that same end results can be obtained by using equipment of other suppliers.

The softness of the bread was measured by a TA-XT2 texture analyser (Stable Micro Systems UK). The bread was sliced and the force to obtain a 25% deformation of 4 slices of 1 cm was measured. This is called the hardness. The hardness is measured at day 1 and day 6 after baking. The difference between the two measure forces is "the loss of softness":

Loss of softness=deformation force at day 6–deformation force at day 1

It is a relative measure. The absolute values have no meaning as such but should be compared to a reference for interpretation.

The elasticity is the difference between the aforementioned force and the force after 20 sec of relaxation. When the elasticity is lower than in the reference bread, this means that the crumb becomes less resilient. The crumb, when compressed does not regain its original shape. This means that during slicing or handling the crumb structure may be lost irreversibly. It is important that by using an added enzyme there is no loss of elasticity compared to a control bread.

Addition of the enzymes of the present invention to the bread dough did not change the proof time, loaf moisture and specific load volume. The initial moisture content of bread varied slightly, but all the loaves lost approximately the same amount of moisture during six days of storage at room temperature.

EXAMPLES

Example 1

Taq Protease

A bread has been baked according to the aforementioned method with addition of Taq protease (eventually in the presence of different doses of Novamyl® 10 000 BG from Novozymes (Denmark)).

Doses are expressed on 100 kg of flour weight used in the baking test.

The following table 1 expresses the loss in softness between day 1 and day 6 after baking as defined previously.

TABLE 1

| Softness | | |
|---|---|---|
| Novamyl® g/100 kg | 800 U Taq protease | 0 U Taq protease |
| 0 | 140 | 209 |
| 2.5 | 128 | 152 |
| 5 | 96 | 118 |
| 8 | 68 | 105 |

The example shows that the use of Taq protease will retard staling in bread. A combination of Taq protease with an intermediate thermostable maltogenic amylase (e.g. Novamyl®, commercial enzyme of Novozymes) will retard staling in bread significantly. So there is a synergistic effect between the thermostable serine proteases and -amylases. This effect becomes more pronounced at higher doses of Novamyl® (see FIG. 2).

Table 2 shows that the elasticity of the bread crumb is hardly affected by the use of the Taq protease.

TABLE 2

| Elasticity | | |
|---|---|---|
| Novamyl® g/100 kg | 800 U Taq protease | 0 U Taq protease |
| 0 | 61.5 | 61.9 |
| 2.5 | 63.1 | 63.4 |
| 5 | 63.0 | 64.2 |
| 8 | 63.4 | 64.9 |

Example 2

Keratinase

A bread baked according to the aforementioned method with the addition of keratinase (eventually in the presence of Novamyl® 10 000 BG from Novozymes (Denmark)).

Doses in the following table 3 are expressed on 100 kg of flour weight used in the baking test.

The table expresses the loss in softness between day 1 and day 6 after baking as defined previously.

TABLE 3

| Softness | | |
|---|---|---|
| Novamyl® g/100 kg | 800 U keratinase | 0 U keratinase |
| 0 | 121 | 209 |
| 2.5 | 95 | 126 |
| 5 | 64 | 111 |
| 8 | 50 | 59 |

It is clear from this experiment that adding the thermostable serine protease keratinase has a pronounced effect on softness. There is a cumulative effect with thermostable maltogenic amylases as Novamyl® (see FIG. 3). It was verified that the small quantity of amylase present in the preparation had no impact on softness and the relaxation ratio by testing this amylase separately.

Table 4 also shows that there is no adverse effect on the relaxation ratio when this protease is used.

TABLE 4

| Elasticity | | |
|---|---|---|
| Novamyl® g/100 kg | 800 U keratinase | 0 U keratinase |
| 0 | 62.6 | 63.6 |
| 2.5 | 64.3 | 65.0 |
| 5 | 65.5 | 65.8 |
| 8 | 65.4 | 65.8 |

Example 3

Thermitase

A bread baked according to the aforementioned method with the addition of thermitase (eventually in combination with Novamyl® 10 000 EG from Novozymes (Denmark)).

Doses in the following table 5 are expressed on 100 kg flour weight used in the baking test.

Table 5 expresses the loss in softness between day 1 and day 6 after baking as defined previously.

TABLE 5

| Softness | | |
|---|---|---|
| Novamyl® g/100 kg | 10.500 U Thermitase | 0 U Thermitase |
| 0 | 140 | 197 |
| 2.5 | 87 | 107 |
| 5 | 65 | 102 |
| 8 | 62 | 68 |

It is obvious from this experiment that adding the thermostable serine protease thermitase has a pronounced effect on softness. There is also a cumulative effect with thermostable maltogenic amylases as Novamyl®. After purification of thermitase there was no alfa-amylase present in the preparation that could have an impact on softness and the relaxation ratio.

Table 6 shows that there is also no adverse effect on the relaxation ratio when this protease is used.

TABLE 6

| Elasticity | | |
| --- | --- | --- |
| Novamyl ® g/100 kg | 10500 U Thermitase | 0 U Thermitase |
| 0 | 62 | 64 |
| 2.5 | 64 | 65 |
| 5 | 64.6 | 66.3 |
| 8 | 64.4 | 66.2 |

The thermitase optimum relative activity (%) of protease at pH 7.0, in a buffered solution of 0.1 M phosphate and the thermal stability (expressed in function or the relative stability at a given temperature) are given in FIGS. 4 and 5 respectively.

Treatment with Taq protease, keratinase and/or or thermitase alone, as mixture and/or together with thermostable amylases (e.g. Novamyl®) significantly affects bread softness. The enzyme treated bread was softer, when Taq protease, keratinase and/or thermitase were added. The examples illustrate that thermostable serine proteases according to the present invention increase shelf live of baked products as far as softness and staling are concerned.

Example 4

Effect of Keratinase, Thermitase and Taq Protease on the Crumb Structure and the Sensory Characteristics of Bread The above-mentioned intermediate thermostable and/or thermostable serine proteases according to the present invention did not have a negative effect on the crumb structure, whereas other non-thermostable proteases or proteases belonging to another group of proteases like papain (cysteine peptidase) or thermolysin (metallopeptidase) did. Use of for instance papain or thermolysin resulted in the crumb structure becoming more open, dependent of the doses that were used. There was also no effect on the volume of the baked products by using the thermostable serine proteases of the invention.

Crust colour, character of crust, colour of crumb, aroma and taste of bread did not change significantly with the addition of keratinase, Taq protease and/or thermitase.

Example 5

Application of Taq Protease in Cake

Recipe: Mix Satin Creme Cake: 1000 g
  Eggs: 350 g
  Oil: 300 g
  Water: 225 g
Method: Mixer: Hobart
  Instrument: Paddle
  Speed: 1 min speed 1 and 2 min speed 2 than Adding oil and water, 1 min speed 1, scrape Down and 2 min speed 1
  Batter weight: 300 g
  Temperature: 180° C.
  Time: 45 min
Doses in the following table 7 are expressed on 100 kg of flour weight used in the baking test.

Table 7 expresses the loss in softness measured after 4 days, 1 week, 2 weeks and 3 weeks after baking.

TABLE 7

| Softness | | | |
| --- | --- | --- | --- |
| | 0 U Taq protease | 600 U Taq protease | 1200 U Taq protease |
| 4 days | 396 | 321 | 237 |
| 1 week | 492 | 379 | 298 |
| 2 weeks | 542 | 457 | 268 |
| 4 weeks | 687 | 441 | 308 |

The invention claimed is:

1. A method for the prevention or retarding of staling during the baking process of bakery products comprising:
  forming a dough with the addition of an antistaling composition comprising an amount of at least one intermediate thermostable and/or thermostable serine protease; and
  baking said said dough, wherein:
  said intermediate thermostable and/or thermostable serine protease comprised in said antistaling composition has a temperature activity optimum between 60° C. and 95° C.;
  the ratio between the protease activity in said antistaling composition at optimum temperature and the protease activity at 25° C. is higher than 10;
  said protease is active during baking; and
  said amount is effective to prevent or retard staling in said bakery products.

2. The method according to claim 1, wherein the ratio between the protease activity in said antistaling composition at optimum temperature and the protease activity at 25° C. is higher than 15.

3. The method according to claim 1, wherein the intermediate thermostable and/or thermostable serine protease is obtained by extraction from naturally-occurring eukaryotic or prokaryotic organisms by synthesis or by genetic engineering.

4. The method according to claim 1, wherein the intermediate thermostable and/or serine protease is a neutral protease.

5. The method according to claim 1, wherein said protease is selected from the group consisting of aqualysin I, aqualysin II, thermitase and keratinase.

6. The method according to claim 5, wherein the protease is aqualysin I.

7. The method according to claim 5, wherein the protease is aqualysin II.

8. The method according to claim 1, wherein the thermostable serine protease is a Taq protease isolated from *Thermus aquaticus* LMG 8924, a keratinase, isolated from *Bacillus licheniformis* LMG 7561 and/or a thermitase isolated from *Thermoactinomyces vulgaris*.

9. The method according to claim 1, further comprising the step of adding another anti-staling additive selected from the group consisting of thermostable α-amylase, β-amylase, intermediate thermostable maltogenic amylase, lipase, glycolsyltransferases, pullulanases and emulsifiers.

10. The method according to claim 9, wherein said emulsifiers are selected from the group consisting of monoglycerides, diglycerides and stearoyllactylates.

11. The method according to claim 1, wherein the bakery product is selected from the group consisting of bread, soft rolls, bagels, donuts, Danish pastry, hamburger rolls, pizza, pita bread and cakes.

12. The method according to claim 1, wherein the intermediate thermostable and/or thermostable serine protease has a temperature activity optimum between 75° C. and 95° C.

13. The method according to claim 1, wherein the intermediate thermostable and/or thermostable serine protease is an alkaline protease.

14. The method according to claim 1, wherein the amount of intermediate thermostable and/or thermostable serine protease is at least about 600 units/100 kg flour.

15. The method according to claim 1, wherein the intermediate thermostable and/or thermostable serine protease has a temperature activity optimum between 80° C. and 95° C.

16. The method according to claim 1, wherein the intermediate thermostable and/or thermostable serine protease has a temperature activity optimum between 85° C. and 95° C.

17. The method according to claim 1, wherein the intermediate thermostable and/or thermostable serine protease is deactivated during the baking process.

18. The method according to claim 1, wherein the intermediate thermostable and/or thermostable serine protease is not deactivated during the baking process.

19. The method according to claim 1, wherein the intermediate thermostable and/or thermostable serine protease has no to low activity during dough resting and/or rising.

20. A method for the prevention or retarding of staling during the baking process of bakery products comprising:
   forming a dough with the addition of an antistaling composition comprising an amount of at least one intermediate thermostable and/or thermostable serine protease; and
   baking said dough, wherein:
   said intermediate thermostable and/or thermostable serine protease comprised in said antistaling composition has a temperature activity optimum between 70° C. and 95° C.;
   the ratio between the protease activity in said antistaling composition at optimum temperature and the protease activity at 25° C. is higher than 10;
   said protease is active during baking; and
   said amount is effective to prevent or retard staling in said bakery products.

21. The method according to claim 20, wherein the ratio between the protease activity in said antistaling composition at optimum temperature and the protease activity at 25° C. is higher than 15.

22. A method for the prevention or retarding of staling during the baking process of bakery products comprising:
   forming a dough with the addition of an antistaling composition comprising at least one intermediate thermostable and/or thermostable serine protease selected from the group consisting of a Taq protease and a keratinase, and in an amount from about 600 to about 1200 units per 100 kg flour; and
   baking said dough, wherein:
   said intermediate thermostable and/or thermostable serine protease comprised in said antistaling composition has a temperature activity optimum between 60° C. and 95° C.;
   the ratio between the protease activity in said antistaling composition at optimum temperature and the protease activity at 25° C. is higher than 10 and;
   said protease is active during baking.

* * * * *